US009606751B2

(12) United States Patent
Shibata (10) Patent No.: US 9,606,751 B2
(45) Date of Patent: Mar. 28, 2017

(54) IMAGE FORMING APPARATUS AND METHOD FOR RESERVING AN IMAGE FORMING APPRATUS (71) Applicant: KYOCERA Document Solutions Inc., Osaka-shi, Osaka (JP)

(72) Inventor: Yukio Shibata, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 0 days.

(21) Appl. No.: 14/670,444

(22) Filed: Mar. 27, 2015

(65) Prior Publication Data

US 2015/0277806 A1 Oct. 1, 2015

(30) Foreign Application Priority Data

Mar. 31, 2014 (JP) .................. 2014-073743

(51) Int. Cl.
G06K 15/00 (2006.01)
G06F 3/12 (2006.01)
G06F 21/35 (2013.01)
G06F 21/60 (2013.01)
G06Q 10/06 (2012.01)
G06Q 10/10 (2012.01)

(52) U.S. Cl.
CPC .......... *G06F 3/1203* (2013.01); *G06F 3/126* (2013.01); *G06F 3/1239* (2013.01); *G06F 3/1268* (2013.01); *G06F 3/1285* (2013.01); *G06F 21/35* (2013.01); *G06F 21/608* (2013.01); *G06Q 10/0631* (2013.01); *G06F 3/12* (2013.01); *G06F 3/1222* (2013.01); *G06F 2221/2137* (2013.01); *G06Q 10/10* (2013.01)

(58) Field of Classification Search
None
See application file for complete search history.

(56) References Cited

U.S. PATENT DOCUMENTS 8,928,911 B2 * 1/2015 Allen .................... G06F 3/1204
358/1.13
2003/0208607 A1 * 11/2003 Yamazaki ............. G06F 3/1204
709/229

(Continued)

FOREIGN PATENT DOCUMENTS

JP 2012146291 A 8/2012

Primary Examiner — Miya J Cato (57) ABSTRACT

This image forming apparatus accepts a reservation for itself from a terminal device communicably connected to the image forming apparatus via a network. Upon receiving a reservation containing a reservation time from the terminal device of a user, who is a reserving user, a reservation unit determines whether the current time is the reservation time. If it is determined that the current time is the reservation time, a prohibiting unit prohibits other users from using the image forming apparatus with the satisfaction of predetermined conditions, including a condition that the terminal device of the reserving user has approached the image forming apparatus. A prohibition removing unit determines whether a user approaching the image forming apparatus is the reserving user after the use of the image forming apparatus is prohibited, and removes the prohibition on the use of the image forming apparatus if the user is the reserving user.

6 Claims, 9 Drawing Sheets (56) References Cited

U.S. PATENT DOCUMENTS

| | | | |
|---|---|---|---|
| 2006/0044612 A1* | 3/2006 | Kayama | G06F 3/1204 358/1.15 |
| 2007/0127054 A1* | 6/2007 | Nishizawa | G06F 21/608 358/1.14 |
| 2008/0077717 A1* | 3/2008 | Okutsu | G06F 3/1203 710/40 |
| 2008/0112004 A1* | 5/2008 | Yoshihara | H04N 1/00915 358/1.14 |
| 2008/0225326 A1* | 9/2008 | Kephart | G06Q 30/0261 358/1.15 |
| 2010/0020345 A1* | 1/2010 | Achiwa | G06F 3/1222 358/1.14 |
| 2010/0020355 A1 | 1/2010 | Imai | |
| 2011/0283345 A1* | 11/2011 | Kamei | G06F 21/34 726/5 |
| 2013/0057897 A1 | 3/2013 | Park et al. | |
| 2015/0062623 A1* | 3/2015 | Yano | G06F 3/1213 358/1.15 |

* cited by examiner

IMAGE FORMING APPARATUS AND METHOD FOR RESERVING AN IMAGE FORMING APPRATUS

INCORPORATION BY REFERENCE

The disclosure of Japanese Patent Application No. 2014-73743 filed on Mar. 31, 2014 including the specification, drawings and abstract is incorporated herein by reference in its entirety.

BACKGROUND

This disclosure relates to image forming apparatuses and reservation methods, and more specifically to an image forming apparatus and a reservation method enabling easy reservations of an available image forming apparatus and making the period of time that the use of the image forming apparatus is prohibited for the reservations as short as possible.

Conventional reservation systems for image forming apparatuses, such as copiers, facsimiles, and multifunction peripherals, are generally configured to reserve the image forming apparatuses by simply designating a previously slotted time frame. However, the reservation systems of this type have a problem that if a print job is not finished within the reserved time frame or is finished before the estimated time is up, the reserved time frame does not match the actual operating time period.

For the purpose of solving the problem, a management server communicably connected to a client terminal has been disclosed in the past. This management server includes a user operation attribute storing means that stores user information and operation attribute information associated with the user information, the operation attribute information containing actual operation time, which is segmented for every user's operation of an image forming apparatus and is the time duration that the user pertinent to the user information has operated the image forming apparatus in the past, an operation reservation accepting means that accepts from the client terminal the user information and an operation reservation instruction containing desired operation termination time of the image forming apparatus, and an operation attribute extracting means that retrieves user information corresponding to the accepted user information from the user operation attribute storing means and extracts operation attribute information associated with the retrieved user information. Furthermore, this management server includes an actual operation time totalizing means that adds up the actual operation time contained in the extracted operation attribute information, an operation start-time calculation means that calculates the time to start operating the image forming apparatus in accordance with the accepted desired operation termination time and the total of the actual operation time, and an operation start-time notifying means that notifies the client terminal, which has accepted the operation reservation instruction, of the calculated operation start time. Each user inputs a desired operation termination time of a copier in consideration of the distance to the copier and user's familiarity with the operation of the copier, and is notified of an operation start time in which the user can finish his/her copying job by the desired operation termination time, and therefore the management server can provide a mechanism for presenting an appropriate operation start time to the user in consideration of the distance between the copier and the users and the users' familiarity with the operation of the copier.

SUMMARY

In one aspect of the present disclosure, an image forming apparatus accepts a reservation for itself from a terminal device communicably connected to the image forming apparatus via a network. The image forming apparatus includes a reservation unit, a prohibiting unit, and a prohibition removing unit. Upon receiving a reservation containing a reservation time from the terminal device of a user, who is a reserving user, the reservation unit determines whether or not the current time is the reservation time. If it is determined that the current time is the reservation time, the prohibiting unit prohibits other users from using the image forming apparatus with the satisfaction of predetermined conditions, including a condition that the terminal device of the reserving user has approached the image forming apparatus. The prohibition removing unit determines whether or not a user approaching the image forming apparatus is the reserving user after the use of the image forming apparatus is prohibited, and removes the prohibition on the use of the image forming apparatus if it is determined that the user is the reserving user.

Another aspect of the present disclosure is directed to a method for reserving an image forming apparatus that accepts a reservation for itself from a terminal device communicably connected to the image forming apparatus via a network. The reservation method includes a step of determining whether the current time is a reservation time, a step of prohibiting other users from using the image forming apparatus, and a step of removing the prohibition on the use of the image forming apparatus. In the step of determining whether the current time is a reservation time, upon receiving a reservation containing a reservation time from the terminal device of a user, who is a reserving user, it is determined whether or not the current time is the reservation time. In the step of prohibiting other users from using the image forming apparatus, if it is determined that the current time is the reservation time, other users are prohibited from using the image forming apparatus with the satisfaction of predetermined conditions, including a condition that the terminal device of the reserving user has approached the image forming apparatus. In the step of removing the prohibition on the use of the image forming apparatus, it is determined whether or not a user approaching the image forming apparatus is the reserving user after the use of the image forming apparatus is prohibited, and the prohibition on the use of the image forming apparatus is removed if it is determined that the user is the reserving user.

DETAILED DESCRIPTION

With reference to the accompanying drawings, an embodiment of the image forming apparatus according to the present disclosure will be described for further understanding of the disclosure. It should be noted that the embodiment described below is a mere example of implementation of the present disclosure, and in no way restricts the technical scope of the disclosure. The alphabetic script "S" attached before a numeral in the flowchart means "step".

<Image Forming Apparatus>

Figure 1:
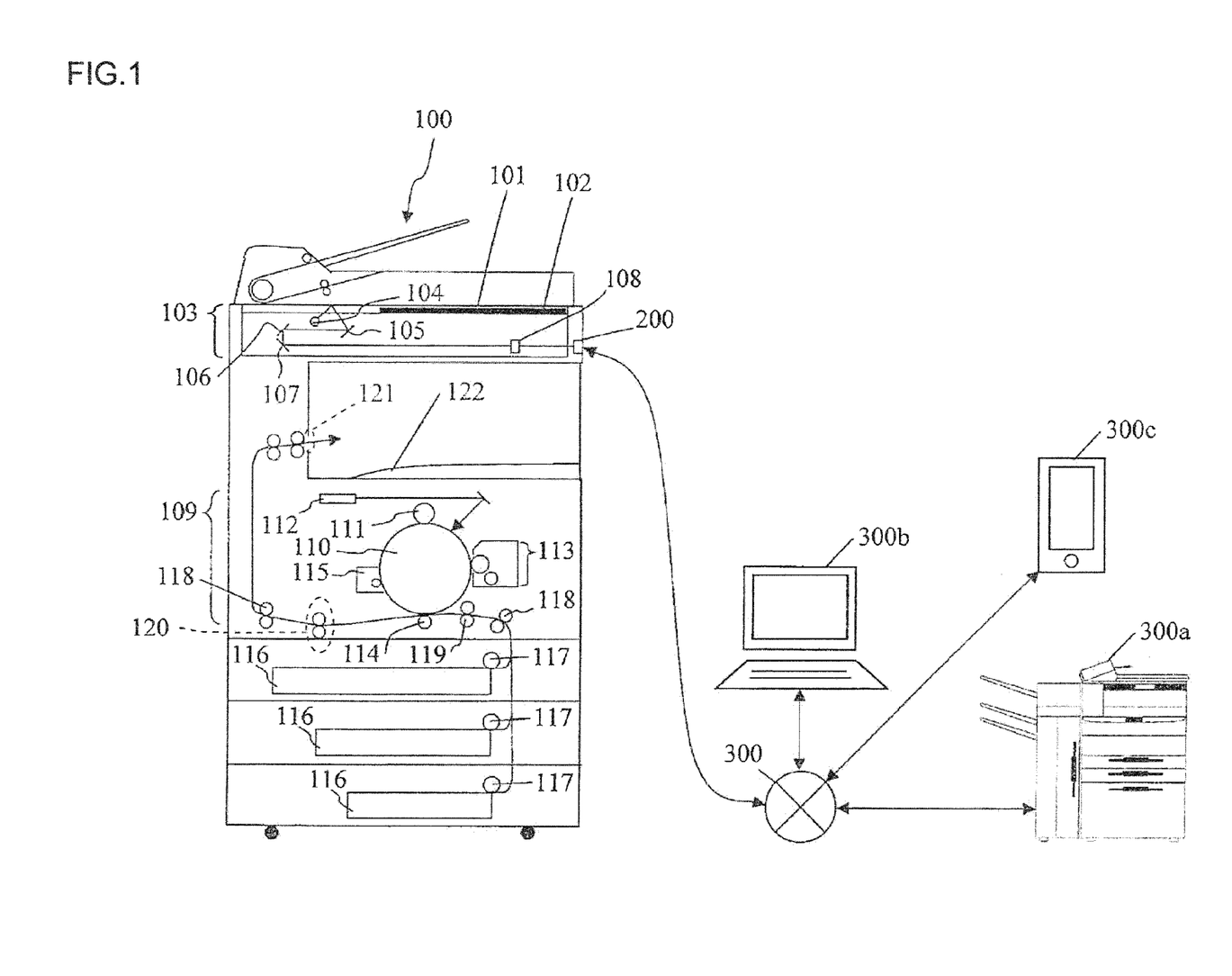
FIG. 1 is a conceptual diagram illustrating the entire internal configuration of a multifunction peripheral according to the present disclosure.

A description will be made below about an image forming apparatus according to an embodiment of the disclosure. FIG. 1 is a simple schematic diagram of the image forming apparatus according to the embodiment of the disclosure. Note that details of units not directly relating to this disclosure are omitted.

The image forming apparatus of this disclosure may be, for example, a multifunction peripheral equipped with a copier, a scanner, a printer, etc., which works as an image forming apparatus having a copy function, a facsimile transmission/reception function, a scanner function, a printer function, etc.

The following is a brief description about the operation of a multifunction peripheral (MFP) 100, for example, when a user uses the copy function.

When the user uses the MFP 100, the user firstly places an original document on a document platen 101 provided on an upper side of an MFP body. Subsequently, the user operates an operating unit 102 (operating panel) provided near the document platen 101 to input setting conditions relating to image formation through an initial screen (operation screen) on the operating unit 102. Then, the user selects the copy function for forming images and depresses a start key provided on the operation unit 102 to cause the MFP 100 to start the selected function.

In an image reading unit 103, light emitted from a light source 104 is reflected on the original document placed on the document platen 101. The reflected light is guided by mirrors 105, 106, 107 to an image pickup device 108. The image pickup device 108 photoelectrically converts the guided light into image data corresponding to the original document.

An image forming unit 109 forms a toner image based on the image data. The image forming unit 109 includes a photoconductive drum 110. The photoconductive drum 110 rotates at a constant speed in a preset direction and is surrounded by a charging device 111, an exposure unit 112, a developing device 113, a transferring device 114, a cleaning unit 115 and some other components disposed in this order from the upstream side along the rotating direction.

The charging device 111 uniformly charges the surface of the photoconductive drum 110. The exposure unit 112 irradiates the charged surface of the photoconductive drum 110 with laser light based on the image data to form an electrostatic latent image. The developing device 113 applies toner onto the electrostatic latent image to form a toner image. The formed toner image is transferred by the transferring device 114 onto a recording medium (ex. a sheet of paper). The cleaning unit 115 removes excess toner left on the surface of the photoconductive drum 110. This series of processes is executed by rotating the photoconductive drum 110.

The sheet of paper is transported from a plurality of paper cassettes 116 provided in the MFP 100. Before being transported, the sheet of paper is pulled out by a pickup roller 117 from any one of the paper cassettes 116. The respective paper cassettes 116 accommodate different types of paper sheets and supply the sheets in accordance with the setting conditions for image formation.

The sheet of paper, which was pulled out to a transport path, is inserted between the photoconductive drum 110 and transferring device 114 by transport rollers 118 and resist rollers 119. The inserted sheet of paper receives the toner image from the transferring device 114 and is transported to a fuser 120.

While the sheet of paper on which the toner image has been transferred passes between a heating roller and a pressure roller provided in the fuser 120, heat and pressure are applied to the toner image to fix the visible image on the sheet of paper. The amount of heat generated by the heating roller is optimally set in accordance with the type of paper to achieve appropriate fixation. Fixing the visible image on the sheet of paper completes the image formation, and the sheet of paper is then ejected by the transport rollers 118 through an output port 121 to an inner tray 122 formed in the middle of the MFP body. The sheet of paper is stacked and accommodated on the inner tray 122. Through the above-described procedure, the MFP 100 provides its copy function to the user.

In addition, the MFP 100 includes a communication unit 200 capable of communicating with a network 300. The communication unit 200 can communicate with other apparatuses via the network 300. The network 300 is communicably connected to another MFP 300a (another image forming apparatus), a management server 300b (terminal device) that manages the status of all the image forming apparatuses (MFP 100 and another MFP 300a) connected to the network 300, and a portable terminal device 300c (or a terminal device) that can access the management server 300b to check the status of the respective image forming apparatuses. Although only one image forming apparatus 300a is connected to the network 300, a plurality of image forming apparatuses 300a can be connected to the network 300.

Figure 2:
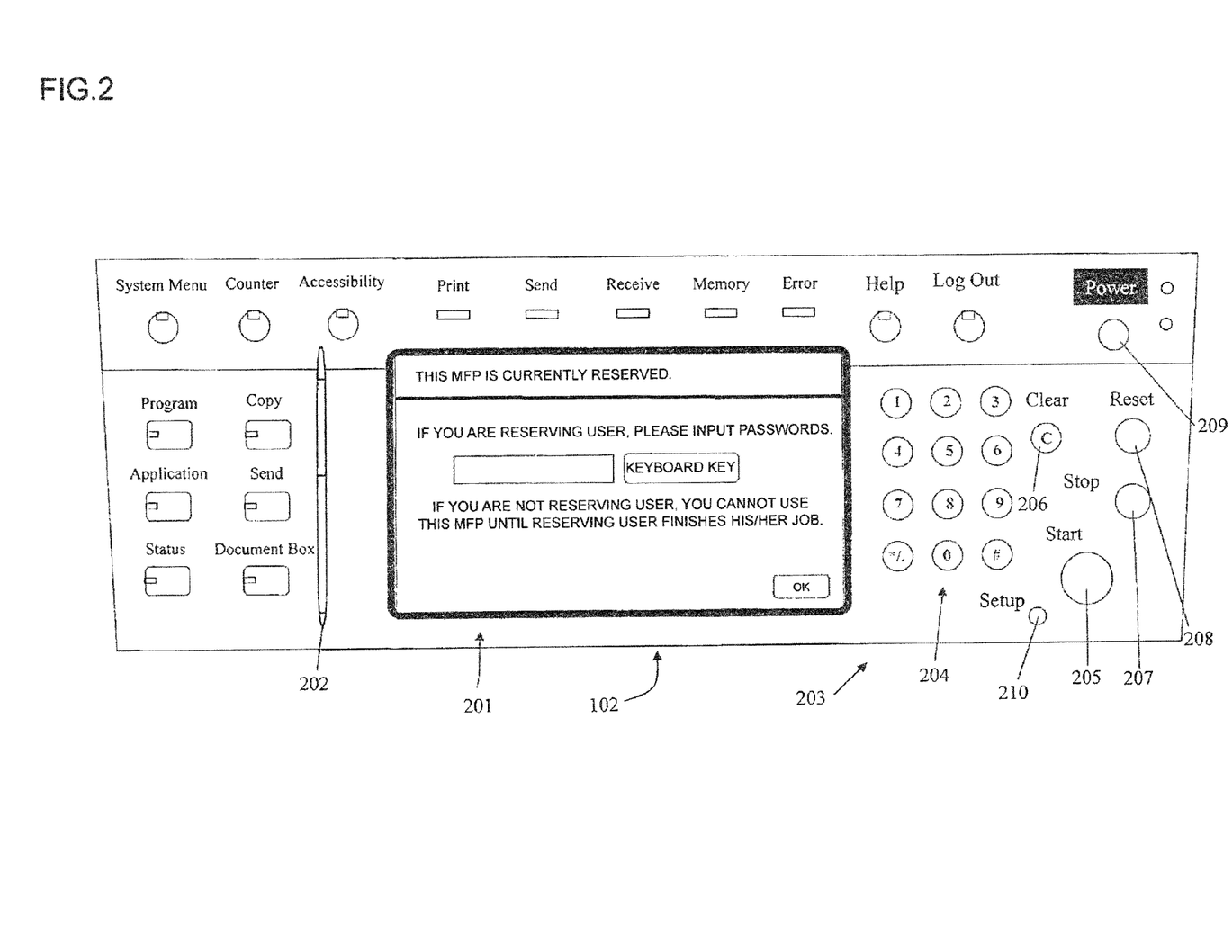
FIG. 2 is a conceptual diagram illustrating the entire configuration of an operating unit according to the disclosure.

FIG. 2 is a conceptual diagram illustrating the entire configuration of the operating unit according to the embodiment of the present disclosure. A user inputs setting conditions for image formation as described above and confirms the input setting conditions through the operating unit 102. In order to input the setting conditions, the user manipulates a touch panel 201 (operating panel), a stylus pen 202, and operational keys 203 provided on the operating unit 102.

The touch panel 201 has both a function of inputting setting conditions and a function of displaying the setting conditions. Specifically, depressing a key within a screen displayed on the touch panel 201 enables input of a setting condition associated with the depressed key.

On the back side of the touch panel 201, there is provided a display unit (not shown), such as a liquid crystal display (LCD), that displays operation screens including, for example, an initial screen. The stylus pen 202 is placed in the vicinity of the touch panel 201. If the user brings the tip of the stylus pen 202 into contact with the touch panel 201, a sensor provided under the touch panel 201 detects the contact point.

In addition, there are a predetermined number of operational keys 203 in the vicinity of the touch panel 201, such as a numeric keypad 204, a start key 205, a clear key 206, a stop key 207, a reset key 208, and a power key 209.

Figure 3:
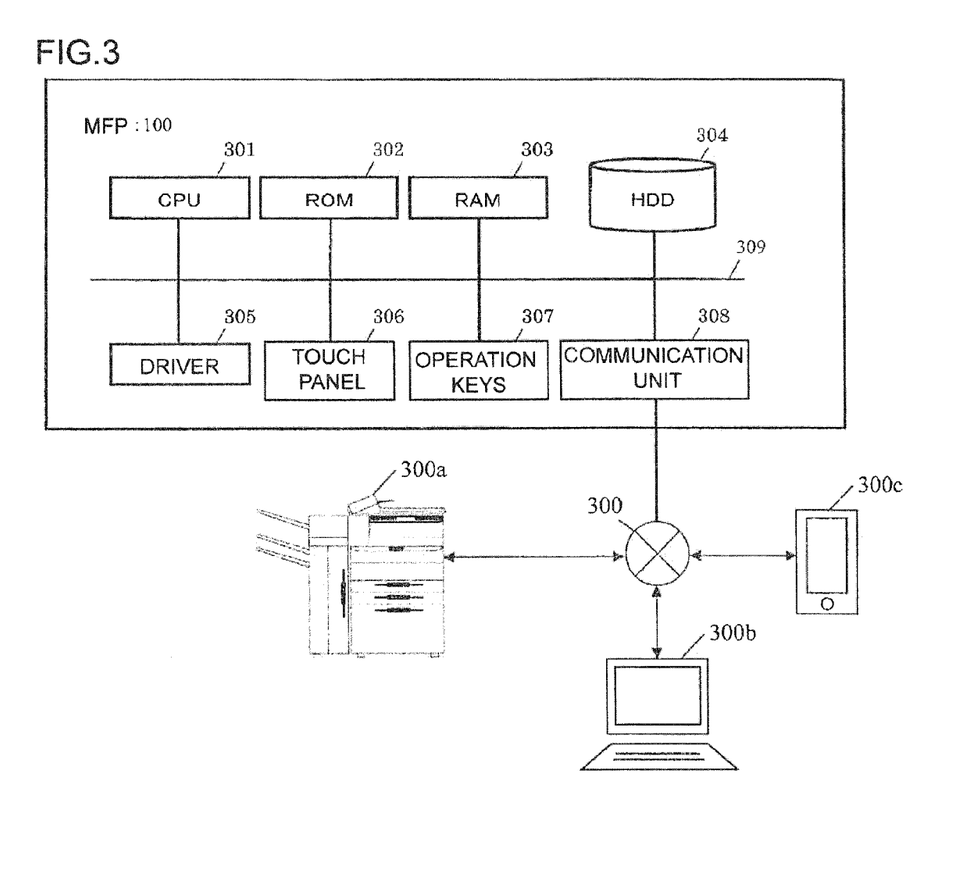
FIG. 3 shows the configuration of control system hardware in the multifunction peripheral according to the disclosure.

With reference to FIG. 3, a description will be made about the configuration of control system hardware in the MFP 100. FIG. 3 shows the configuration of the control system hardware in the MFP 100 according to the present disclosure. Note that details of units not directly relating to this disclosure are omitted.

A control circuit of the MFP 100 is composed of a central processing unit (CPU) 301, a read only memory (ROM) 302, a random access memory (RAM) 303, a hard disk drive (HDD) 304, a driver 305 associated with each driving unit, a touch panel 306 (201), operational keys 307 (203), and a communication unit 308 (200), which are connected to one another by an internal bus 309.

The CPU 301, for example, uses the RAM 303 as a work area. The CPU 301 executes programs stored in the ROM 302, HDD 304, or other storage devices to control the operation of the respective driving units shown in FIG. 1 by exchanging data and instructions from the driver 305, touch panel 306, and communication unit 308 and signals and commands corresponding to the operational keys based on the execution results.

The communication unit 308 is communicably connected to another MFP 300a, the management server 300b, and portable terminal device 300c via the network 300, such as a local area network (LAN) and the Internet.

In addition to the aforementioned driving units, the MFP 100 includes other units (see FIG. 4), which will be described later, and also implements the units by the CPU 301 that executes programs. The ROM 302, HDD 304 and other storage devices contain programs and data used to implement the units that will be described later.

Embodiment of the Enclosure

Figure 4:
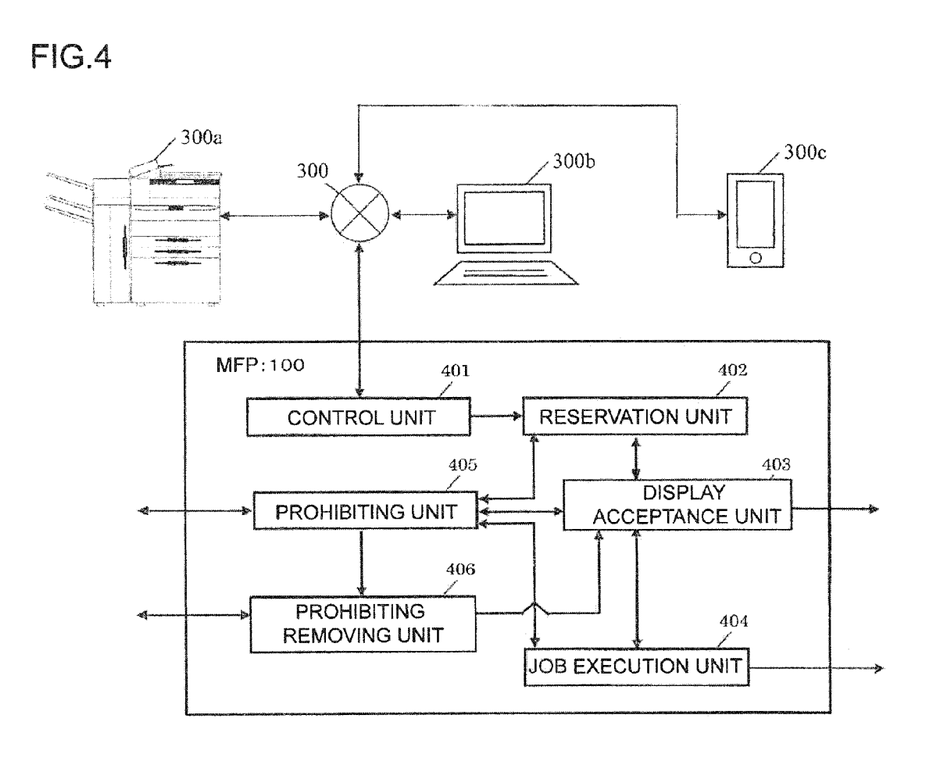
FIG. 4 is a functional block diagram of the multifunction peripheral according to an embodiment of the disclosure.
Figure 5:
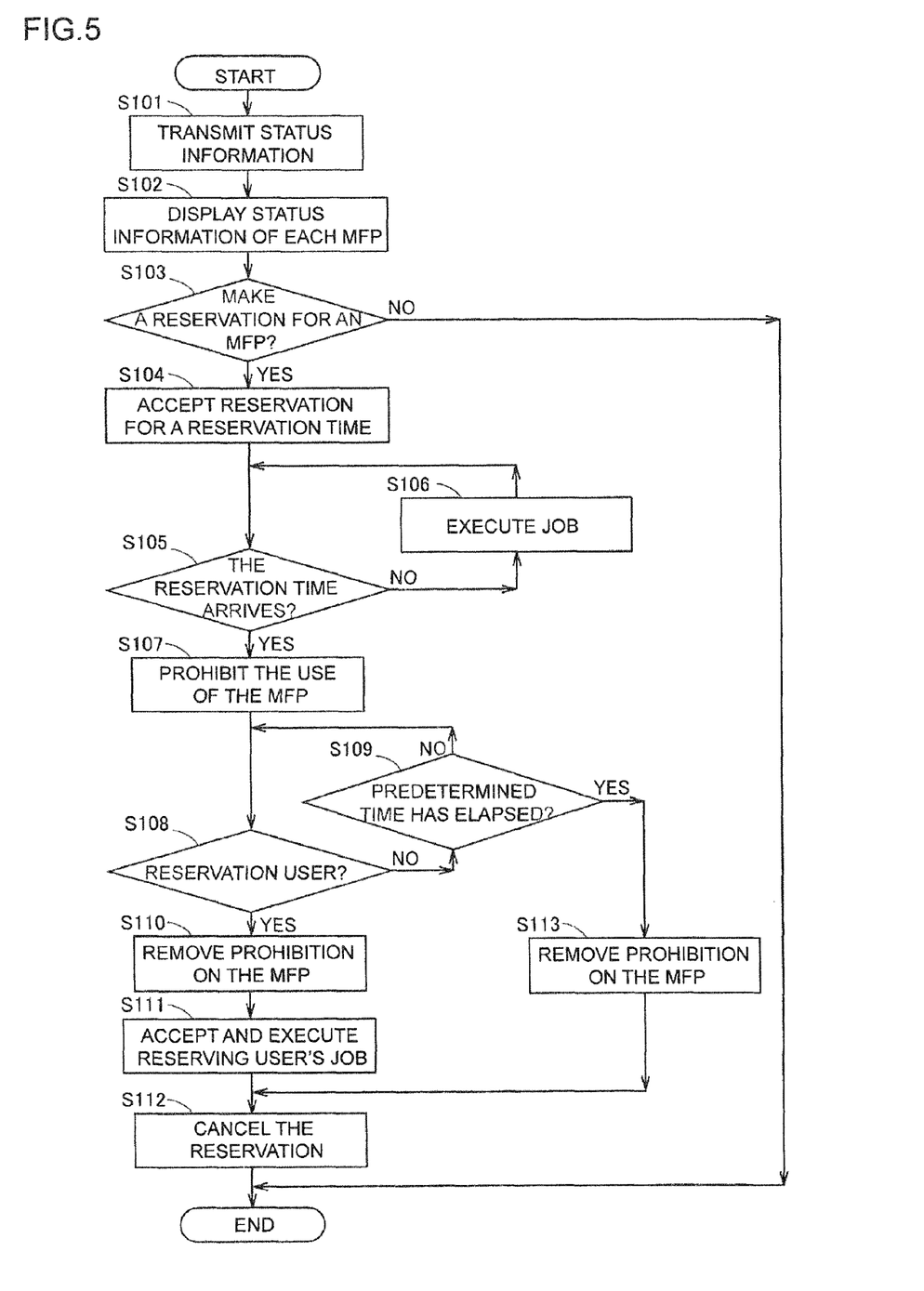
FIG. 5 is a flow chart describing an execution procedure according to the embodiment of the disclosure.

Referring to FIGS. 4 and 5, a description will be given about the configuration and execution procedure according to the embodiment of the present disclosure. FIG. 4 is a functional block diagram of the MPF of this disclosure. FIG. 5 is a flow chart describing the execution procedure of this disclosure.

First, an MFP 100 sharable in a convenience store or other types of stores has a control unit 401 that regularly transmits status information about the availability of the MFP 100 (e.g. no reservations have been made for the day) at predetermined intervals via the network 300 to the management server 300b (FIG. 5: S101). The status information herein may be, for example, information regarding the day's reservations indicating whether or not the MFP 100 is reserved for the day, or may be information regarding the actual occupancy status of the MFP 100 indicating whether or not a user is currently using the MFP 100 and whether or not a user is currently operating the MFP 100.

The control unit 401 can be configured to transmit status information spontaneously on a regular basis as described above. Alternatively, the management server 300b can send a command requesting the transmission of status information to the control unit 401 of the MFP 100 and the control unit 401 can transmit the status information to the management server 300b at the time when the control unit 401 receives the command.

Upon receiving status information (that no reservations have been made for the day) of the MFP 100, the management server 300b temporarily stores the status information in a predetermined memory. The management server 300b performs this series of processes on all the MFPs (MFP 100 and MFP 300a) communicably connected to the network 300.

If a user remote from the MFP 100 accesses the management server 300b via the network 300 from a user's portable terminal device 300c, the management server 300b transmits the status information of every MFP temporarily stored in the memory. Upon receiving the status information of every MFP, the portable terminal device 300c displays the status information as an MFP status check screen 600 on its own display unit (e.g. touch panel) and accepts a reservation for an MFP (FIG. 5: S103).

Figure 6A:
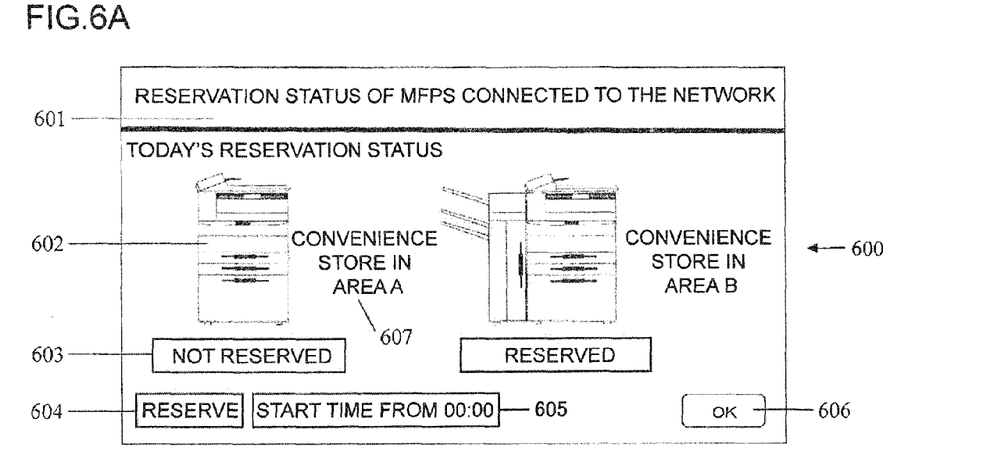
FIG. 6A illustrates an exemplary multifunction peripheral status check screen displayed on a portable terminal device according to the embodiment of the disclosure.

On the MFP status check screen 600, as shown in FIG. 6A, displayed are a predetermined message "Reservation status of MFPs connected to the network" 601, preview images 602 of the MFPs, status information 603 (e.g., "Not reserved", "Reserved" indicating the reservation status for the day) of the MFPs, a reservation key 604 used to reserve an MFP with the indication "Not reserved" as status information 603, a reservation time key 605 used to input a reservation time, and an OK key 606. It is preferable to display, for example, address information 607, near the preview images 602, to indicate where the MFPs in the form of the preview images 602 are installed. In addition, the reservation time key 605 is configured so that the user can input a desired time through key operations.

Thus, the user can easily check the reservation status (usage) of each MFP connected to the network 300 only by accessing the management server 300b.

If the user does not make a reservation of any of the MFPs while viewing the MFP status check screen 600 (FIG. 5: NO in S103), the user depresses the OK key 606 to cause the portable terminal device 300c to cancel the MFP status check screen 600, thereby finishing the reservation process.

In the case where the user reserves the MFP in the "Not reserved" status while viewing the reservation status (FIG. 5: YES in S103), the user depresses the reservation key 604 as well as inputting a specific reservation time (e.g., "10:00") using the reservation time key 605, and depresses the OK key 606. In response to the depression of the OK key 606, the portable terminal device 300c transmits information about the "Not reserved" MFP 100 and the reservation time "10:00" to the management server 300b. The management server 300b receives the information about the "Not reserved" MFP 100 and the reservation time "10:00" and then transmits information about the reservation time "10:00" to the "Not reserved" MFP 100.

Upon receiving the information about the reservation time "10:00", the control unit 401 of the MFP 100 notifies the reservation unit 402 of the reservation time. The reservation unit 402 receives the notification and accepts the reservation for the MFP 100 at the reservation time "10:00" (FIG. 5: S104). Thus, the user can easily reserve the "Not reserved" MFP 100 according to the day's reservation status.

The reservation unit 402 issues a given password (e.g., "ABC") for the reservation for the reservation time "10:00" and transmits the password to the user's portable terminal device 300c via the control unit 401. Upon receiving the password, the portable terminal device 300c displays the password "ABC" on its own display unit and indicates that the reservation has been successfully made. Thus, the user can recognize the password necessary to perform the reserved job as a reserving user.

Upon accepting the reservation, the reservation unit 402 notifies the control unit 401 that the MFP 100 cannot accept reservations from other users for the day. The control unit 401 receives the notification and then transmits information that the MFP 100 is reserved for the day, as status information of the MFP 100, to the management server 300b via the network 300. After the management server 300b receives the new status information (indicating that the MFP 100 is reserved for the day) from the MFP 100, the management server 300b temporarily stores the status information in a predetermined memory, and deletes the old status information.

Therefore, if another user checks the MFP status check screen 600 via the management server 300b after the previous user reserved the MFP 100, the status information 603 of the MFP 100 indicates "Reserved", thereby preventing the MFP 100 from being double-booked for the day.

Although the user operates the reservation time key 605 to input the reservation time in the above description, the reservation time can be input in other ways. For example, the portable terminal device 300c acquires its own location information using a GPS function preinstalled therein and also acquires address information 607 of the "Not reserved" MFP 100 to calculate the distance between the portable terminal device 300c and the "Not reserved" MFP 100 based on the location information of the portable terminal device 300c and the address information 607. Then, on the assumption that the user travels by a certain transportation means (on foot, by bicycle, by automobile, etc; on foot in this description), the portable terminal device 300c calculates the travel time in which the user travels from the position of the portable terminal device 300c to the "Not reserved" MFP 100 based on the calculated distance and the traveling speed of the transportation means. It is also possible that the portable terminal device 300c adds the travel time to the current time at which the reservation key 604 was depressed to obtain an added time so as to automatically input (decide) the added time as the reservation time corresponding to a time to start using the MFP 100.

Upon accepting the information about the reservation time "10:00", the reservation unit 402 notifies a display acceptance unit 403 of the reservation time "10:00". The display acceptance unit 403 receives the notification and then displays an initial screen (operation screen) on the touch panel 201 together with reservation information indicating that the MFP 100 has been already reserved.

Figure 6B:
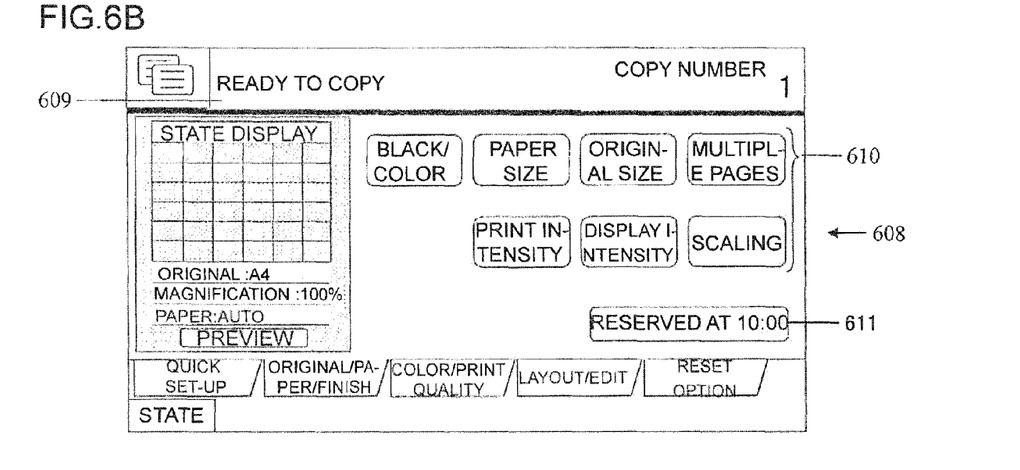
FIG. 6B illustrates an exemplary operation screen displayed on a touch panel according to the disclosure.

On the operation screen 608, as shown in FIG. 6B, displayed are a predetermined message "Ready to copy" 609, function item keys 610 used to input setting conditions for a copy function or the like, and reservation information "Reserved for 10:00" 611. Before another user uses the MFP 100, the user can check the reservation information 611 and understand that the MFP 100 has been reserved. Inclusion of the reservation time "10:00" in the reservation information 611 is preferable because the user can understand the further detailed reservation status.

After the display acceptance unit 403 displays the operation screen 608, the reservation unit 402 compares the current time (e.g., "9:00") with the reservation time "10:00" in response to the accepted reservation to determine whether or not the current time is the reservation time (FIG. 5: S105).

If it is determined that the current time is not the reservation time (FIG. 5: NO in S105), the reservation unit 402 determines that the MFP 100 is still available for other users, and repeats the determination process.

If at this point, for example, another user inputs a given job through the operation screen 608 and depresses the start key 205, the display acceptance unit 403 accepts the job and the depression of the start key 205 and then notifies a job execution unit 404 of the acceptance. The job execution unit 404 receives the notification and executes the job under the preset setting conditions input by the user (FIG. 5: S106).

Thus, other users can freely use the "reserved" MFP 100 while the current time is not the reservation time.

On the other hand, if it is determined in S105 that the current time is the reservation time (FIG. 5: YES in S105), the reservation unit 402 determines that the MFP 100 is no longer available for other users and then notifies a prohibiting unit 405 that the MFP 100 is not available. The prohibiting unit 405 receives the notification and then prohibits (locks) other users from using the MFP 100 with the satisfaction of predetermined conditions (FIG. 5: S107).

The prohibiting unit 405 can prohibit other users from using the MFP 100 by any methods. In this description, the following method is used as an example.

Figure 7A:
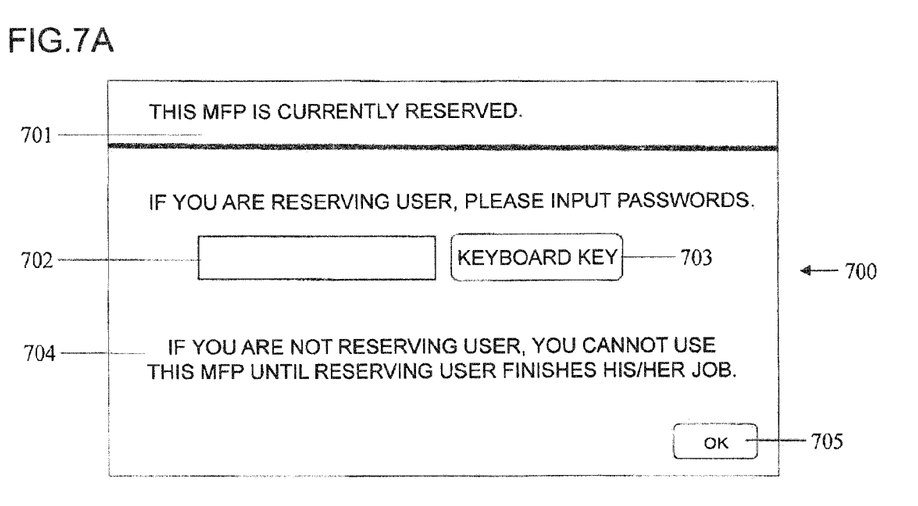
FIG. 7A illustrates an exemplary prohibition screen displayed on the touch panel according to the disclosure.

In the typical method, the prohibiting unit 405 immediately blocks inputs operated by other users on the condition that the current time is the reservation time, and then displays a prohibition screen 700 through the display acceptance unit 403.

On the prohibition screen 700, as shown in FIG. 7A, displayed are a predetermined message "This MFP is currently reserved" 701, a password entry field 702 used by reserving users to input passwords, a keyboard key 703 used to input the passwords, a message 704 saying that the MFP is not available to persons other than the reserving user, and an OK key 705. Even if other users try to use the MFP 100, the prohibition screen 700 can make them aware of the unavailability of the MFP 100.

For a case where the job execution unit 404 is still in the middle of job execution for another user when the reservation time arrives, the prohibiting unit 405 can be configured to wait for the job execution unit 404 to finish the job for the user and to display the prohibition screen 700 at the moment when the job execution unit 404 completes the job execution for the user. Thus, the user can leave the MFP 100 after his/her job is finished.

Alternatively, the prohibiting unit 405 can be configured so as to immediately block inputs operated by the user and displays the prohibition screen 700 on the conditions that the reservation time arrives and the reserving user's portable terminal device 300c approaches the MFP 100.

Any method can be used for the prohibiting unit 405 to determine whether or not the reserving user's portable terminal device 300c is approaching the MFP 100. For example, a (well-known) short-distance communicating technology (Bluetooth) preinstalled in the MFP 100 can be used for such determination. In the case of using the short-distance communication technology (Bluetooth), if the reservation unit 402 accepts a reservation for the MFP 100 at reservation time "10:00" (FIG. 5: S104) from a user (reserving user), the reservation unit 402 acquires identification information (e.g., communication information, serial number, ID information, etc) of the reserving user's portable terminal device 300c via the control unit 401 and notifies the prohibiting unit 405 of the identification information. The prohibiting unit 405 having received the notification acquires identification information of a terminal device approaching the MFP 100 using the short-distance communication technology (Bluetooth), and compares the acquired identification information of the terminal device with the identification information of the portable terminal device 300c of the reserving user acquired when the reservation was accepted to determine whether or not the identification information of the approaching terminal device matches the identification information of the portable terminal device 300c. If they match, the prohibiting unit 405 determines that the portable terminal device 300c of the reserving user has arrived near the MFP 100.

Thus, the prohibiting unit 405 allows other users to use the MFP 100 without showing the prohibition screen 700 even though the reservation time arrives, thereby allowing users to execute their jobs as much as possible, and therefore effective use of the MFP 100 can be made.

When the prohibiting unit 405 prohibits the use of the MFP 100, the prohibiting unit 405 notifies a prohibition removing unit 406 of the prohibition. The prohibition removing unit 406 receives the notification and then determines whether or not a user approaching the MFP 100 is the reserving user (FIG. 5: S108) (authentication).

The method by which the prohibition removing unit 406 determines whether or not the approaching user is the reserving user can be any methods. In this embodiment, the following method is used as an example.

In the typical method, the prohibition removing unit 406 utilizes the prohibition screen 700 to prompt the user approaching the MFP 100 to input a given password. If the user inputs the given password through the prohibition screen 700 and depresses the OK key 705, the prohibition removing unit 406 compares the input password with the password "ABC" issued by the reservation unit 402 to determine whether or not their passwords match.

If the determination result indicates that the input password does not match the issued password (FIG. 5: NO in S108), the prohibition removing unit 406 determines that the approaching user is not the reserving user and further determines whether or not a predetermined prohibited period of time (e.g., one minute, three minutes, five minutes, etc.) has elapsed since the use of the MFP 100 was prohibited (FIG. 5: S109).

If it is determined that the prohibited period of time has not elapsed yet in S109 (FIG. 5: NO in S109), the process returns to S108 and the prohibition removing unit 406 prompts the approaching user to input the given password again to determine whether or not the input password matches the issued password (FIG. 5: S108).

Figure 7B:
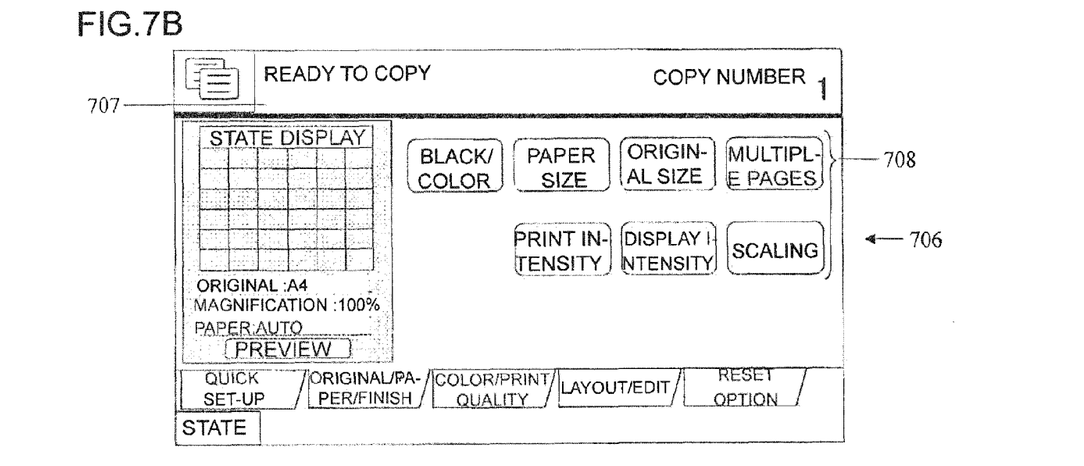
FIG. 7B illustrates an exemplary operation screen displayed on the touch panel according to the disclosure.

On the other hand, if the input password matches the issued password in S108 (FIG. 5: YES in S108), the prohibition removing unit 406 determines that the user is the reserving user and removes the prohibition on the use of the MFP 100 (FIG. 5: S110). In other words, the prohibition removing unit 406 removes the block on inputs operated by users, and displays a regular operation screen 706 through the display acceptance unit 403.

On the operation screen 706, as shown in FIG. 7B, displayed are a predetermined message "Ready to copy" 707, and functional item keys 708 used for inputting setting conditions of the copy function and other functions. At this point, the reservation information is no longer present in the operation screen 706. Therefore, the MFP 100 is ready for immediate use by the reserving user.

If, for example, the reserving user inputs a given job through the operation screen 706 and depresses the start key 205, the display acceptance unit 403 accepts the job and the depression of the start key 205, and the job execution unit 404 executes the job based on the setting conditions input by the reserving user (FIG. 5: S111).

After the job execution unit 404 completely executes the job under the setting conditions input by the reserving user, the prohibition removing unit 406 detects the completion of the job and cancels the reservation accepted by the reservation unit 402 (FIG. 5: S112). Then, the prohibition removing unit 406 deletes the password "ABC" issued by the reservation unit 402. If the reservation unit 402 accepts the cancellation of the reservation, the reservation unit 402 can accept reservations from other users for the day and therefore notifies the control unit 401 of the availability. The control unit 401 receives the notification and then transmits information that the MFP 100 is not reserved for the day, as status information about the reservation status of the MFP 100, to the management server 300b via the network 300. After the management server 300b receives the new status information (indicating that the MFP 100 is not reserved for the day) from the MFP 100, the management server 300b temporarily stores the status information in a predetermined memory, and deletes the old status information.

This automatic cancellation of the reservation of the reserving user upon completion of the job of the reservation user makes the MFP 100 available to accept new reservations from other users, thereby enabling effective use of the MFP 100.

By the way, there are some other methods by which the prohibition removing unit 406 determines whether or not a user is a reserving user, in addition to the above described method with password entry. For example, the MFP 100 can be configured so as to acquire identification information of a terminal device approaching the MFP 100 by using the short-distance communication technology (Bluetooth) and then to determine whether or not the acquired identification information of the approaching terminal device matches identification information of the portable terminal device 300c of the reserving user acquired when the reservation was accepted. The identification information includes the password "ABC" issued by the reservation unit 402. This method can eliminate the necessity for the user to input the password, but can provide automatic authentication, thereby eliminating burdensome processes, such as key operation.

In a case where a reserving user cannot come to the MFP 100 for some reasons, the prohibition removing unit 406 determines that the prohibited time has elapsed in S109 (FIG. 5: YES in S109). Then, the prohibition removing unit 406 determines that the reserving user has canceled the reservation and removes the prohibition on the use of the MFP 100 as with the above-described case (FIG. 5: S113) as well as cancels the reservation accepted by the reservation unit 402 as with the above-described case (FIG. 5: S111). If the reserving user cannot arrive in time for the reservation time, the MFP permits other users to use the MFP 100, thereby enabling effective use of the MFP 100.

As described above, the present disclosure is characterized by including the reservation unit 402 that, upon receiving a reservation containing a reservation time from the portable terminal device 300c of a user, who is a reserving user, determines whether or not the current time is the reservation time; the prohibiting unit 405 that prohibits other users from using the MFP 100 with the satisfaction of predetermined conditions including a condition that the portable terminal device 300c of the reserving user has approached the MFP 100 when it is determined that the current time is the reservation time; and the prohibition removing unit 406 that determines whether or not a user approaching the MFP 100 is the reserving user after the use of the MFP 100 is prohibited, and removes the prohibition of the use of the MFP 100 if the user is the reserving user.

This disclosure makes it possible to easily reserve an available image forming apparatus (MFP) and also to make the period of time that the use of the image forming apparatus is prohibited for the reservations as short as possible.

Although password entry is employed as a method to make authentication of reserving users in this embodiment of the disclosure, other methods are also applicable. For example, user identification information that can identify a reserving user may be available. In this case, an IC card capable of providing user identification information may be used. The prohibition removing unit 406 acquires user identification information from the IC card of a user and determines whether or not the acquired user identification information matches user identification information of a reserving user acquired when a reservation was accepted to determine whether or not the user is the reserving user. It is needless to say, in this case, that the prohibition removing unit 406 needs to acquire the user identification information of the reserving user in advance from the portable terminal device 300c or by having the reserving user input the information when the reserving user makes the reservation through the portable terminal device 300c.

Furthermore, although the MFP 100 is configured to include the various units in the present embodiment, a configuration may include provision of a storage medium that enables storage of a program for implementing the respective units in the storage medium. In this configuration, the program is read out by the MFP 100 to thereby implement the respective units by the MFP 100. In this case, the program itself that is read out of the storage medium may embody the operation and effect of the present disclosure. Furthermore, provision is also possible of the steps for realizing each unit as a method stored in a hard disk.

The image forming apparatus and reservation method according to the present disclosure are useful in copiers, printers, and image forming apparatuses in addition to, of course, MFPs, and also effective in enabling easy reservations of an available image forming apparatus and making the period of time that the use of the image forming apparatus is prohibited for the reservations as short as possible.

What is claimed is:

1. An image forming apparatus that accepts a reservation for itself from a portable terminal device communicably connected to the image forming apparatus via a network, comprising:
   a reserver that, upon receiving a reservation including a reservation time from the terminal device of a user, who is a reserving user, determines whether or not the current time is the reservation time;
   a prohibitor that prohibits other users from using the image forming apparatus with the satisfaction of predetermined conditions including a condition that the terminal device of the reserving user has approached the image forming apparatus when it is determined that the current time is the reservation time; and
   a prohibition remover that determines whether or not a user approaching the image forming apparatus is the reserving user after the use of the image forming apparatus is prohibited, and removes the prohibition on the use of the image forming apparatus if the user is the reserving user,
   wherein the prohibitor is configured so as to permit inputs operated by the user without displaying a prohibition screen on the condition that the terminal device of the reserving user does not approach the image forming apparatus even when the reservation time arrives,
   the prohibitor is configured so as to block inputs operated by the user and displays the prohibition screen on the conditions that the reservation time arrives and the terminal device of the reserving user approaches the image forming apparatus,
   the prohibition remover cancels the reservation of the reserving user after a job executor completely executes a job under setting conditions input by the reserving user, and makes the image forming apparatus available to accept new reservations from other users,
   the reserver calculates a travel time based on location information of the terminal device of the reserving user which is acquired using a GPS function preinstalled therein, address information of the image forming apparatus, and a transportation means of the reserving user, and accepts an added time which is obtained by adding the travel time to the current time as the reservation time, and
   the prohibition remover determines whether or not the reserving user is approaching the image forming apparatus by using short-distance communicating technology preinstalled in the image forming apparatus.

2. The image forming apparatus according to claim 1, wherein
   the reserver issues a given password upon the acceptance of the reservation and transmits the password to the terminal device, and
   the prohibition remover prompts the user approaching the image forming apparatus to input the password and determines that the user is the reserving user if the input password matches the issued password.

3. The image forming apparatus according to claim 1, wherein
   the reserver acquires identification information of the terminal device upon the acceptance of the reservation, and
   the prohibition remover acquires identification information of a terminal device approaching the image forming apparatus and determines that the user of the approaching terminal device is the reserving user if the acquired identification information of the approaching terminal device matches the identification information of the terminal device acquired at the acceptance of the reservation.

4. The image forming apparatus according to claim 1, wherein
   the prohibition remover determines whether or not a predetermined prohibited period of time has elapsed since the prohibition on the use of the image forming apparatus and removes the prohibition on the use of the image forming apparatus if the predetermined prohibited period of time has elapsed.

5. The image forming apparatus according to claim 1, wherein the image forming apparatus is communicably connected to a management server via the network, and
   the management server manages status information of each image forming apparatus communicably connected to the network and causes the terminal device to display the status information of each image forming apparatus.

6. A method for reserving an image forming apparatus that accepts a reservation for itself from a portable terminal device communicably connected to the image forming apparatus via a network, comprising the steps of:

upon receiving a reservation including a reservation time from the terminal device of a user, who is a reserving user, determining whether or not the current time is the reservation time;

prohibiting other users from using the image forming apparatus with the satisfaction of predetermined conditions, including a condition that the terminal device of the reserving user has approached the image forming apparatus when it is determined that the current time is the reservation time; and determining whether or not a user approaching the image forming apparatus is the reserving user after the use of the image forming apparatus is prohibited, and removing the prohibition on the use of the image forming apparatus if the user is the reserving user, wherein the step of prohibiting other users from using the image forming apparatus with the satisfaction of predetermined conditions comprises permitting inputs operated by the user without displaying a prohibition screen on the condition that the terminal device of the reserving user does not approach the image forming apparatus even when the reservation time arrives, the step of prohibiting other users from using the image forming apparatus with the satisfaction of predetermined conditions comprises blocking inputs operated by the user and displays the prohibition screen on the conditions that the reservation time arrives and the terminal device of the reserving user approaches the image forming apparatus, the step of determining whether or not a user approaching the image forming apparatus is the reserving user after the use of the image forming apparatus is prohibited comprises cancelling the reservation of the reserving user after a job executor completely executes a job under setting conditions input by the reserving user, and making the image forming apparatus available to accept new reservations from other users, the step of determining whether or not the current time is the reservation time comprises calculating a travel time based on location information of the terminal device of the user which is acquired using a GPS function preinstalled therein, address information of the image forming apparatus, and a transportation means of the user, and accepts an added time which is obtained by adding the travel time to the current time as the reservation time, and the step of prohibiting other users from using the image forming apparatus with the satisfaction of predetermined conditions comprises determining whether or not the reserving user is approaching the image forming apparatus by using short-distance communicating technology preinstalled in the image forming apparatus.

* * * * *